(12) United States Patent
Tang (10) Patent No.: US 11,452,054 B2
(45) Date of Patent: *Sep. 20, 2022

(54) METHOD FOR SIGNAL TRANSMISSION, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 153 days.

This patent is subject to a terminal disclaimer.

(21) Appl. No.: 16/929,969

(22) Filed: Jul. 15, 2020

(65) Prior Publication Data
US 2020/0344705 A1  Oct. 29, 2020

Related U.S. Application Data

(63) Continuation of application No. 16/092,356, filed as application No. PCT/CN2016/086568 on Jun. 21, 2016, now Pat. No. 10,880,846.

(51) Int. Cl.
*H04W 72/08* (2009.01)
*H04W 56/00* (2009.01)
(Continued)

(52) U.S. Cl.
CPC ......... *H04W 56/001* (2013.01); *H04L 1/1812* (2013.01); *H04L 5/0094* (2013.01);
(Continued)

(58) Field of Classification Search
CPC ... H04W 56/001; H04W 48/16; H04W 56/00; H04W 16/28; H04W 72/0446;
(Continued)

(56) References Cited

U.S. PATENT DOCUMENTS

2014/0086173 A1   3/2014  Sadeghi et al.
2014/0204851 A1*  7/2014  Chen ................. H04W 48/12
                                                     370/329
(Continued)

FOREIGN PATENT DOCUMENTS

CN    101379726 A    3/2009
CN    102111846 A    6/2011
(Continued)

OTHER PUBLICATIONS

International Search Report in the international application No. PCT/CN2016/086568, dated Feb. 27, 2017.
(Continued)

*Primary Examiner* — Lan-Huong Truong
(74) *Attorney, Agent, or Firm* — Ladas & Parry LLP (57) ABSTRACT

Embodiments of the present invention provide a method for signal transmission, a network device and a terminal device. The method for signal transmission comprises: a network device sends a plurality of synchronization signals within one synchronization signal period; the terminal device detects the plurality of synchronization signals sent by the network device within one synchronization signal period; and the network device sends a broadcast channel corresponding to the plurality of synchronization signals or other signals, and the terminal device detects, according to the detected plurality of synchronization signals, the broadcast channel corresponding to the plurality of synchronization signals and sent by the network device, or other signals sent by the network device. By means of the method for signal transmission, the network device and the terminal device, the signal detection performance of the terminal device can be improved.

19 Claims, 5 Drawing Sheets

(51) Int. Cl.
  *H04W 48/16*  (2009.01)
  *H04L 1/18*  (2006.01)
  *H04L 5/00*  (2006.01)
  *H04W 16/28*  (2009.01)
  *H04W 72/04*  (2009.01)

(52) U.S. Cl.
  CPC ........... *H04W 16/28* (2013.01); *H04W 48/16* (2013.01); *H04W 56/00* (2013.01); *H04W 72/0446* (2013.01); *H04W 72/0453* (2013.01); *H04W 72/0466* (2013.01); *H04L 5/0005* (2013.01)

(58) Field of Classification Search
  CPC ......... H04W 72/0453; H04W 72/0466; H04W 48/10; H04L 1/1812; H04L 5/0094; H04L 5/0005; H04B 7/086
  See application file for complete search history.

(56) References Cited

U.S. PATENT DOCUMENTS

| | | | |
|---|---|---|---|
| 2014/0211701 A1* | 7/2014 | Damnjanovic | H04L 5/005 |
| | | | 370/329 |
| 2014/0211750 A1 | 7/2014 | Larsson et al. | |
| 2014/0322363 A1* | 10/2014 | Jamerson | A61K 45/06 |
| | | | 434/236 |
| 2014/0334399 A1* | 11/2014 | Xu | H04W 72/1273 |
| | | | 370/329 |
| 2015/0049741 A1 | 2/2015 | Chen et al. | |
| 2015/0103781 A1 | 4/2015 | Wu | |
| 2016/0105860 A1 | 4/2016 | Li et al. | |
| 2016/0135226 A1* | 5/2016 | Gunnarsson | H04W 72/12 |
| | | | 370/329 |
| 2016/0183170 A1 | 6/2016 | Pu et al. | |
| 2016/0269154 A1 | 9/2016 | Damnjanovic et al. | |
| 2016/0277225 A1 | 9/2016 | Frenne et al. | |
| 2016/0294528 A1* | 10/2016 | Kim | H04L 5/0053 |
| 2016/0295607 A1* | 10/2016 | Vajapeyam | H04L 5/0085 |
| 2016/0308637 A1 | 10/2016 | Frenne et al. | |
| 2017/0181003 A1 | 6/2017 | Chen et al. | |
| 2017/0288831 A1* | 10/2017 | Cezanne | H04L 5/0048 |
| 2019/0028222 A1 | 1/2019 | Frenne et al. | |
| 2021/0013984 A1 | 1/2021 | Frenne et al. | |

FOREIGN PATENT DOCUMENTS

| | | | |
|---|---|---|---|
| CN | 102763446 A | 10/2012 | |
| CN | 103402251 A | 11/2013 | |
| CN | 103916171 A | 7/2014 | |
| CN | 104937874 A | 9/2015 | |
| CN | 105191453 A | 12/2015 | |
| CN | 105340132 A | 2/2016 | |
| CN | 105453654 A | 3/2016 | |
| CN | 105723639 A | 6/2016 | |
| EP | 2901640 A2 | 8/2015 | |
| EP | 2976151 A2 | 1/2016 | |
| EP | 3291631 A1 * | 3/2018 | ........ H04W 56/0015 |
| JP | 2016512405 A | 4/2016 | |
| JP | 2017503386 A | 1/2017 | |
| WO | 2014098509 A1 | 6/2014 | |
| WO | 2014161106 A1 | 10/2014 | |
| WO | 2015080646 A1 | 6/2015 | |
| WO | 2015080649 A1 | 6/2015 | |
| WO | 2016080646 A1 | 6/2015 | |
| WO | 2016057193 A1 | 4/2016 | |

OTHER PUBLICATIONS

English translation of the Written Opinion of the International Search Authority in the international application No. PCT/CN2016/086568, dated Feb. 27, 2017.
Supplementary European Search Report in the European application No. 16905783.3, dated Nov. 15, 2018.
First Office Action of the European application No. 16905783.3, dated Jan. 31, 2020.
3GPP TS 36.211 V13.1.0 (Mar. 2016); 3rd Generation Partnership Project; Technical Specification Group Radio Access Network; Evolved Universal Terrestrial Radio Acces (E-UTRA); Physical channels and modulation (Release 13).
3GPP TSG RAN WG1 #58 R1-16559; WF on Supported NR Operations; Nanjing, China, May 23-27, 2016.
First Office Action of the Chinese application No. 201680084002.0, dated Aug. 14, 2019.
Second Office Action of the Chinese application No. 201680084002.0, dated Oct. 31, 2019.
Third Office Action of the Chinese application No. 201680084002.0, dated Jan. 19, 2020.
Written Opinion of the Singaporean application No. 11201902383T, dated Mar. 4, 2020.
Non-Final Office Action of the U.S. Appl. No. 16/092,356, dated Dec. 30, 2019.
European Search Report in the European application No. 21178166.1, dated Oct. 6, 2021.
Office Action of the Taiwanese application No. 106119700, dated Mar. 5, 2021.
Nec, Further clarification of on-Demand S-BCH [online], 3GPP TSG-RAN WG#56 R2-063090, 2008, Nov. 10, Internet<URL: http://www.3gpp.org/ftp/tsq-ran/WG2_RL2/TSGR2 56/Documents/R2 /063090. zip>.
Office Action of the Indian application No. 201817043323, dated Aug. 28, 2020.
First Office Action of the Japanese application Ne. 2018-554546, dated Sep. 8, 2020.
Notice of Allowance of the U.S. Appl. No. 16/092,356, dated Apr. 15, 2020.
Supplementary Notice of Allowance of the U.S. Appl. No. 16/092,356, dated May 5, 2020.
Corrected Notice of Allowance of the U.S. Appl. No. 16/092,356, dated Aug. 17, 2020.
Supplementary Notice of Allowance of the U.S. Appl. No. 16/092,356, dated Oct. 7, 2020.
First Office Action in corresponding European application No. 16905783.3, dated Jan. 31, 2020.
First Office Action of the Canadian application No. 3043766, dated Jun. 18, 2020.
3GPP TSG RAN WG1 #85 R1-165559; WF on Supported NR Operations; Nanjing, China, May 23-27, 2016 Agenda item 7.1.6.
3GPP TS 36.211 V13.1.0 (Mar. 2016); 3rd Generation Partnership Project; Technical Specification Group Radio Access Network; Evolved Universal Terrestrial Radio Access (E-UTRA); Physical channels and modulation (Release 13).
Third Office Action of the Chinese application No. 201660084002.0, dated Jan. 19, 2020.
NEC, Further clarification of on-demand S-BCH[online], 3GPP TSG-RAN WG2#56 R2-063090, Nov. 10, 2006, InternetKURL http://www.3gpp.org/ftp/tsg_ran/WG2_RL2/TSGR2_56/Documents/R2-063090.zip>.
First Office Action of the Japanese application No. 2018-554546, dated Sep. 8, 2020.
First Office Action of the Chinese application No. 202010643046.0, dated Jun. 1, 2022.
First Office Action of the Mexican application No. MX-a-2018-014288, dated May 27, 2022.
First Office Action of the Korean application No. 10-2018-7030288, dated Jun. 26, 2022.

* cited by examiner

METHOD FOR SIGNAL TRANSMISSION, NETWORK DEVICE AND TERMINAL DEVICE

CROSS-REFERENCE TO RELATED APPLICATIONS

This is a continuation application of U.S. application Ser. No. 16/092,356 filed on Oct. 9, 2018, which is a national phase application of PCT Application No. PCT/CN201/086568 filed on Jun. 21, 2016, the entire contents of which are incorporated herein by reference in their entireties.

TECHNICAL FIELD

The present disclosure relates to the field of wireless communication, and more particularly to a method, a network device and a terminal device of signal transmission.

BACKGROUND

In a 5th-Generation (5G) technology, data transmission in a high band (a center frequency is higher than 6 GHz, for example, 28 GHz) is required to be supported to meet a requirement of 5G on transmission rate. During data transmission in a high band, for achieving a higher transmission rate, a Multiple-input Multiple-Output (MIMO) antenna technology is required to be adopted. Adoption of the MIMO technology in a high band makes a high requirement on a radio frequency device of an antenna and may also greatly increase hardware cost of the antenna, for example, the number of Analogue/Digital (A/D) or Digital/Analogue (D/A) converters. For reducing the cost, the number of transceiver radio frequency units is usually reduced in an analogue beam forming manner in the high band. An analogue beam forming technology refers to a technology for performing beam forming on an analogue signal through a phase shifter after D/A conversion. The analogue beam forming technology is not only adopted for transmission of a data channel but also may be adopted for a cell access process.

In a Long Term Evolution (LTE) system, a terminal device is required to detect a Synchronization Signal (SS) from a cell and a corresponding broadcast channel at first for cell access. In such a cell access manner, SS detection performance of the terminal device is relatively poor, and thus influence may be brought to subsequent detection performance of the corresponding broadcast channel or another signal.

SUMMARY

Embodiments of the disclosure provide a method and device of signal transmission, which may improve signal detection performance of a terminal device.

A first aspect provides a method of signal transmission, which may include the following actions. A terminal device detects multiple SSs sent by a network device in an SS period. The terminal device, according to the detected multiple SSs, detects a broadcast channel sent by the network device and corresponding to the multiple SSs or detects a signal, other than the corresponding broadcast channel, sent by the network device after the multiple SSs.

In the embodiments of the disclosure, the terminal device detects the multiple SSs sent by the network device in the SS period, and then the terminal device may detect the signal or a broadcast channel subsequently sent by the network device according to the multiple SSs in the SS period, so that time for which the terminal device detects the subsequent signal or the broadcast channel may be shortened, and signal detection performance of the terminal device may further be improved.

According to an embodiment, a same sequence may be adopted for the multiple SSs.

In the embodiments of the disclosure, the same sequence is adopted for the multiple SSs detected by the terminal device, that is, the multiple SSs are repeatedly sent, so that the terminal device may detect the multiple SSs on the basis of the same information which is contained, and SS detection accuracy may be improved.

According to an embodiment, the multiple SSs may differ from each other in at least one of the following transmission parameters: a frequency-domain resource, a time-domain resource, a subcarrier spacing or a data transmission time length.

According to an embodiment, the transmission parameters for the multiple SSs sent by the network device are different, so that the terminal device may receive the multiple different signals better.

According to an embodiment, the action that the terminal device detects the multiple SSs sent by the network device in the SS period may include the following actions. The terminal device detects the multiple SSs according to a transmission parameter predetermined by the network device and the terminal device or according to a transmission parameter determined on the basis of information contained in part of SSs in the multiple SSs.

According to an embodiment, the action that the terminal device detects the broadcast channel sent by the network device and corresponding to the multiple SSs according to the detected multiple SSs may include the following actions. The terminal device determines at least one of the following transmission parameters for the corresponding broadcast channel according to information contained in the detected multiple SSs: the frequency-domain resource, the time-domain resource, an information scrambling manner, the subcarrier spacing or the data transmission time length; and the terminal device detects the corresponding broadcast channel according to the determined transmission parameter.

According to an embodiment, the action that the terminal device detects the multiple SSs sent by the network device in the SS period may include the following actions. The terminal device adopts different beam forming receiving weights to detect the multiple SSs. The terminal device, according to the detected multiple SSs, detects the broadcast channel sent by the network device and corresponding to the multiple SSs or detects a signal other than the corresponding broadcast channel, sent by the network device may include that: the terminal device determines a first beam forming receiving weight of the terminal device according to the beam forming receiving weight adopted for a first SS in the detected multiple SSs, and the terminal device adopts the first beam forming receiving weight to detect the other signal or detect the corresponding broadcast channel.

In the embodiments of the disclosure, the terminal device adopts different beam forming receiving weights to receive the multiple SSs, so that the terminal device may determine the beam forming receiving weight adopted to detect the signal or broadcast channel subsequently sent by the network device in the SS period according to a beam forming receiving weight corresponding to a certain received SS meeting a requirement, that is, the terminal device may shorten a process of determining the beam forming receiving weight configured to receive the signal or broadcast channel subsequently sent by the network device.

According to an embodiment, the first SS may be an SS with maximum receiving quality in the multiple SSs detected by the terminal device.

In the embodiments of the disclosure, the terminal device determines the beam forming weight corresponding to the SS with maximum receiving quality as the beam forming weight for receiving the signal or broadcast channel subsequently sent by the network device, so that receiving performance of the signal or broadcast channel subsequently sent may be improved.

According to an embodiment, the method may further include the following actions. The terminal device determines, according to the first beam forming receiving weight, a first beam forming transmitting weight configured for the terminal device to send signals to the network device.

According to an embodiment, the action that the terminal device determines, according to the first beam forming receiving weight, the first beam forming transmitting weight configured for the terminal device to send the signals to the network device may include the following actions. When the number of radio frequency units, configured to receive the SSs, of the terminal device is equal to the number of radio frequency units, configured to send the signals to the network device, of the terminal device, the terminal device determines the first beam forming receiving weight as the first beam forming transmitting weight.

According to an embodiment, the action that the terminal device determines, according to the first beam forming receiving weight, the first beam forming transmitting weight configured for the terminal device to send the signals to the network device may include the following actions. When the number of the radio frequency units, configured to receive the SSs, of the terminal device is unequal to the number of the radio frequency units, configured to send the signals to the network device, of the terminal device, the terminal device determines the first beam forming transmitting weight according to an angle corresponding to the first beam forming receiving weight and the number of the radio frequency units, configured to send the signals to the network device, of the terminal device.

According to an embodiment, the corresponding broadcast channel may include multiple broadcast channels containing the same information.

According to an embodiment, the corresponding broadcast channel detected by the terminal device may include multiple broadcast channels, and the multiple broadcast channels may differ from each other in at least one of the following transmission parameters: a Hybrid Automatic Repeat reQuest (HARQ) redundancy version, the frequency-domain resource, the time-domain resource, the information scrambling manner, the subcarrier spacing or the data transmission time length.

According to an embodiment, when the corresponding broadcast channel detected by the terminal device includes the multiple broadcast channels, the method may further include the following actions. The terminal device sends broadcast channel indication information to the network device. The broadcast channel indication information is configured to indicate a first broadcast channel in the multiple broadcast channels.

In the embodiments of the disclosure, the terminal device sends indication information which indicates a certain broadcast channel to the network device, so that the network device may determine a sending parameter which may be adopted when the network device subsequently sends the broadcast channel according to the indication information.

According to an embodiment, the first broadcast channel may be a broadcast channel with maximum receiving quality in the multiple broadcast channels received by the terminal device by adopting the first beam forming receiving weight.

According to an embodiment, the action that the terminal device sends the broadcast channel indication information to the network device may include the following actions. The terminal device sends the broadcast channel indication information to the network device through a control channel or a random access channel.

According to an embodiment, physical resources adopted for the SSs sent for many times may form a predefined mapping relationship with physical resources adopted for the corresponding broadcast channel.

According to an embodiment, the corresponding broadcast channel may be a Physical Broadcast Channel (PBCH) configured to transmit a Master Information Block (MIB).

A second aspect provides a method of a signal transmission, which may include the following actions. A network device sends multiple SSs in an SS period. The network device sends broadcast channel signal corresponding to the multiple SSs or sends a signal other than the corresponding broadcast channel.

In the embodiments of the disclosure, the network device sends the multiple SSs in the SS period, and then a terminal device may detect the signal or broadcast channel subsequently sent by the network device according to the multiple SSs in the SS period, so that time for which the terminal device detects the signal or the broadcast channel may be shortened, and signal detection performance of the terminal device may further be improved.

According to an embodiment, the same sequence may be adopted for the multiple SSs.

According to an embodiment, the action that the network device sends the multiple SSs in the SS period may include the following actions. The network device adopts the same beam forming transmitting weight to send the multiple SSs in the SS period.

In the embodiments of the disclosure, a same beam forming transmitting weight is adopted for the multiple SSs sent by the network device in the SS period, so that the terminal device may detect the subsequent signal or the broadcast channel according to the multiple SSs better.

According to an embodiment, the multiple SSs may differ from each other in at least one of the following transmission parameters: a frequency-domain resource, a time-domain resource, a subcarrier spacing or a data transmission time length.

According to an embodiment, a transmission parameter for the multiple SSs may be a transmission parameter predetermined by the network device and a terminal device, or the transmission parameter for the multiple SSs may be a transmission parameter determined by the network device according to information contained in part of SSs in the multiple SSs.

According to an embodiment, at least one of the following transmission parameters for the corresponding broadcast channel may be determined by the network device according to information contained in the multiple SSs: the frequency-domain resource, the time-domain resource, an information scrambling manner, the subcarrier spacing or the data transmission time length. The action that the network device sends the broadcast channel corresponding to the multiple SSs after the multiple signals are sent may include the following action. The network device sends the corresponding broadcast channel according to the determined transmission parameter after the multiple SSs are sent.

According to an embodiment, the action that the network device sends the broadcast channel corresponding to the multiple SSs after the multiple SSs are sent may include the following actions. The network device sends multiple broadcast channels corresponding to the multiple SSs after the multiple SSs are sent. The multiple broadcast channels contains same information.

According to an embodiment, the action that the network device sends the multiple broadcast channels corresponding to the multiple SSs after the multiple SSs are sent may include the following action. The network device adopts different beam forming transmitting weights to send the multiple broadcast channels corresponding to the multiple SSs after the multiple SSs are sent.

According to an embodiment, the corresponding broadcast channel may include the multiple broadcast channels, and the multiple broadcast channels may differ from each other in at least one of the following transmission parameters: a HARQ redundancy version, the frequency-domain resource, the time-domain resource, the information scrambling manner, the subcarrier spacing or the data transmission time length.

According to an embodiment, when the corresponding broadcast channel includes the multiple broadcast channels, the method may further include the following actions. The network device receives broadcast channel indication information sent by the terminal device. The broadcast channel indication information is configured to indicate a first broadcast channel in the multiple broadcast channels.

According to an embodiment, the action that the network device receives the broadcast channel indication information sent by the terminal device may include the following actions. The network device receives the broadcast channel indication information sent by the terminal device through a control channel or a random access channel.

According to an embodiment, physical resources adopted for the SSs sent for many times may form a predefined mapping relationship with physical resources adopted for the corresponding broadcast channel.

According to an embodiment, the method may further include the following actions. The network device determines a first beam forming transmitting weight adopted by the network device to subsequently send the broadcast channel according to the beam forming transmitting weight adopted to send the first broadcast channel.

According to an embodiment, the action that the network device determines the first beam forming transmitting weight adopted by the network device to send the other signal according to the beam forming transmitting weight adopted to send the first broadcast channel may include the following actions. The network device determines the beam forming transmitting weight adopted to send the first broadcast channel as the first beam forming transmitting weight.

According to an embodiment, the method may further include the following actions. The network device determines a beam forming receiving weight configured for the network device to receive signals according to the first beam forming transmitting weight.

According to an embodiment, the action that the network device determines the beam forming receiving weight configured for the network device to receive the signals according to the first beam forming transmitting weight may include the following actions. When the number of radio frequency units, configured to send the first broadcast channel, of the network device is equal to the number of radio frequency units, configured to receive the signals, of the network device, the first beam forming transmitting weight is determined as the beam forming receiving weight.

According to an embodiment, the action that the network device determines the beam forming receiving weight configured for the network device to receive the signals according to the first beam forming transmitting weight may include the following actions. When the number of the radio frequency units, configured to send the first broadcast channel, of the network device is unequal to the number of the radio frequency units, configured to receive the signals, of the network device, the beam forming receiving weight is determined according to an angle corresponding to the first beam forming transmitting weight and the number of the radio frequency units configured to receive the signals.

According to an embodiment, the corresponding broadcast channel may be a PBCH configured to transmit a MIB.

A third aspect provides a terminal device, which may be configured to execute each process executed by the terminal device in the method of signal transmission in the first aspect and each implementation mode. The terminal device includes: a first detection module, configured to detect multiple SSs sent by a network device in an SS period; and a second detection module, configured to, according to the detected multiple SSs, detect a signal sent by the network device after the multiple SSs or detect a broadcast channel sent by the network device and corresponding to the multiple SSs.

A fourth aspect provides a network device, which may be configured to execute each process executed by the network device in the method of signal transmission in the second aspect and each implementation mode. The network device includes: a first sending module, configured to send multiple SSs in an SS period; and a second sending module, configured to, after the multiple SSs are sent, send another signal or send a broadcast channel corresponding to the multiple SSs.

A fifth aspect provides a terminal device, which includes a processor, a memory, a receiver and a sender, wherein the memory is configured to store a code, the processor is configured to execute the code in the memory, and when the code is executed, the processor calls the receiver and the sender to implement the method of the first aspect.

A sixth aspect provides a network device, which includes a processor, a memory, a receiver and a sender, wherein the memory is configured to store a code, the processor is configured to execute the code in the memory, and when the code is executed, the processor calls the receiver and the sender to implement the method of the second aspect.

A seventh aspect provides a system chip, which includes an input interface, an output interface, at least one processor and a memory, wherein the processor is configured to execute a code in the memory, and when the code is executed, the processor may implement each process executed by a terminal device in the method of signal transmission in the first aspect and each implementation mode.

An eighth aspect provides a system chip, which includes an input interface, an output interface, at least one processor and a memory, wherein the processor is configured to execute a code in the memory, and when the code is executed, the processor may implement each process executed by a network device in the method of signal transmission in the second aspect and each implementation mode.

A ninth aspect provides a computer-readable storage medium, which stores a program, wherein the program enables a terminal device to execute any method of signal transmission in the first aspect and each implementation mode thereof.

A tenth aspect provides a computer-readable storage medium, which stores a program, wherein the program enables a network device to execute any method of signal transmission in the second aspect and each implementation mode thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5G system.

In the embodiments of the disclosure, a terminal device may also refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 50 network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. Descriptions will be made below with a specific example that a base station is the network device.

Figure 1:
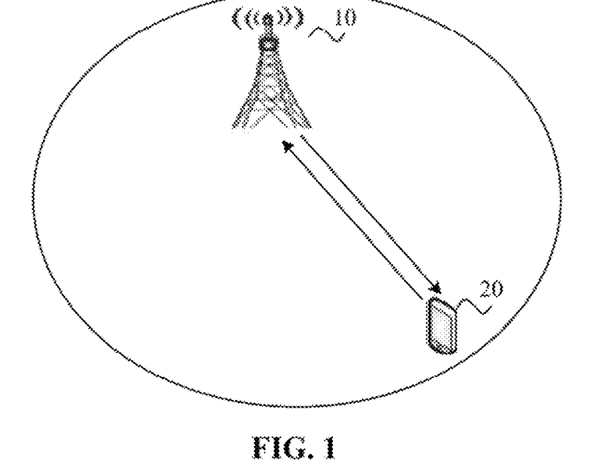
FIG. 1 illustrates a schematic diagram of an application scenario according to an embodiment of the disclosure.

FIG. 1 illustrates a schematic diagram of an application scenario according to an embodiment of the disclosure. A communication system in FIG. 1 may include a base station 10 and a terminal device 20. The base station 10 is configured to provide communication service for the terminal device 20 for access to a core network. The terminal device 20 searches an SS, broadcast signal and the like sent by the base station 10 to access the network, thereby communicating with the network. Arrows illustrated in FIG. 1 may represent uplink/downlink transmission implemented through a cellular link between the terminal device 20 and the base station 10.

Figure 2:
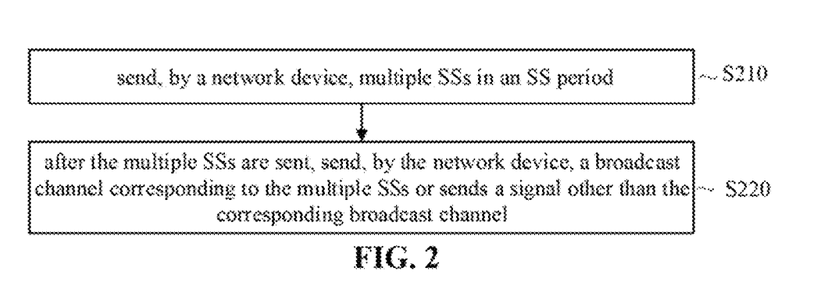
FIG. 2 illustrates a schematic flowchart of a method of signal transmission according to an embodiment of the disclosure.

FIG. 2 illustrates a schematic flowchart of a method of signal transmission according to an embodiment of the disclosure. A terminal device in the method may be a terminal device 20 in FIG. 1 and a network device in the method may be a base station 10 in FIG. 1. It is to be understood that FIG. 2 shows steps or operations of the method of signal transmission. However, these steps or operations are only examples. Other operations or transformations of each operation in FIG. 2 may also be executed in the embodiment of the disclosure.

In S210, the network device sends multiple SSs in an SS period.

In S220, after the multiple SSs are sent, the network device sends a broadcast channel corresponding to the multiple SSs or sends a signal other than the corresponding broadcast channel.

Figure 3:
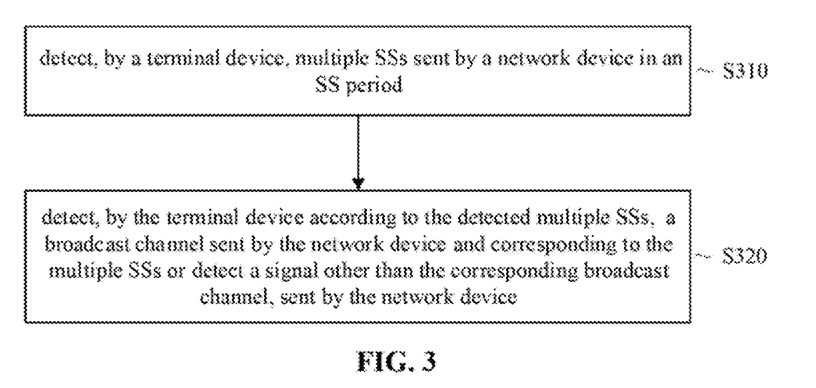
FIG. 3 illustrates a schematic flowchart of a method of signal transmission according to an embodiment of the disclosure.

Correspondingly, FIG. 3 illustrates a schematic flowchart of a method of signal transmission executed by a terminal device according to an embodiment of the disclosure. It is to be understood that FIG. 3 shows actions or operations of the method of signal transmission. However, these actions or operations are only examples. Other operations or transformations of each operation in FIG. 3 may also be executed in the embodiment of the disclosure.

In S310, the terminal device detects multiple SSs sent by a network device in an SS period.

In S320, the terminal device, according to the detected multiple SSs, detects a broadcast channel sent by the network device and corresponding to the multiple SSs or detects a signal, other than the corresponding broadcast channel, sent by the network device.

In the embodiment of the disclosure, the network device sends the multiple SSs in the SS period, and the terminal device performs detection on the basis of the multiple SSs, so that SS detection performance may be improved. The corresponding broadcast channel is required to be detected on the basis of information contained in the SSs, so that broadcast channel detection performance may also be improved.

In the embodiment of the disclosure, the SS may be a Primary Synchronization Signal (PSS), may also be a Secondary Synchronization Signal (SSS) and may further be an SS formed by a PSS and an SSS.

In the embodiment of the disclosure, the same sequence may be adopted for the multiple SSs. That is, the multiple SSs are the same signals which are repeatedly sent. The multiple SSs may be obtained by adopting a sequence such as a Zadoff-Chu (ZC) sequence and a pseudo-random sequence.

In the embodiment of the disclosure, the signal sent by the network device after the multiple SSs may be an SS of another type, a pilot signal, a data signal or the like. There are no limits made thereto in the disclosure.

In the embodiment of the disclosure, physical resources adopted for the SSs and corresponding broadcast channel sent by the network device may form a predefined corresponding relationship. For example, the SSs and the corresponding broadcast channel are transmitted on a predetermined fixed time-frequency resource. Or, time-domain resources for the SSs and the corresponding broadcast channel are spaced by a fixed transmission time unit.

In the embodiment of the disclosure, a method for determining the broadcast channel corresponding to the SSs is as follows: an Identification (ID) contained in the SSs is adopted to determine a transmission format of the broadcast channel. For example, scrambling of the broadcast channel is determined. The ID contained in the SSs may be an ID configured to identify a network, for example, a cell ID, a hypercell ID and a system ID.

In the embodiment of the disclosure, different transmission parameters may be adopted for the SSs sent for many times by the network device in the SS period. The transmission parameters mentioned herein may include at least one of the following parameters: a frequency-domain resource, which is, for example, a Physical Resource Block (PRB), a subcarrier, a sub-band or a set of multiple of the abovementioned resources and may also be a frequency hopping pattern configured to determine the frequency-domain resource; a time-domain resource, which is, for example, a subframe, a symbol or another defined transmission time unit and may also be a set of the abovementioned resources or a frequency hopping pattern configured to determine the time-domain resource; a subcarrier spacing; or a data transmission time length, for example, a duration.

The transmission parameters for the multiple SSs may be predetermined by the network device and the terminal device or are contained in part of SSs in the multiple SSs.

If the transmission parameters for the multiple SSs are predetermined by the network device and the terminal device, the terminal device detects the multiple SSs according to the predetermined transmission parameters. If the transmission parameters for the multiple SSs are contained in part of SSs in the multiple SSs, the terminal device, after detecting the SSs containing the transmission parameters, detects the other SSs in the multiple SSs on the basis of the transmission parameters contained in the SSs of this part. For example, the terminal device may determine the transmission parameters for the other SSs according to the network side ID contained in part of SSs.

In the embodiment of the disclosure, the network device may adopt the same beam forming weight to send the multiple SSs in the SS period. The beam forming weight may be an analogue beam forming weight, or a digital beam forming weight or a hybrid beam forming weight. Here, the hybrid beam forming weight is a joint analogue forming and digital forming weight, for example, a matrix Kronecker product or product of the analogue beam forming weight and the digital beam forming weight.

More specifically, the beam forming weight adopted by the network device to send the SSs may be a wide beam forming weight. For example, a broadcast beam forming weight is adopted. Therefore, the SSs may be endowed with wider coverage.

In the embodiment of the disclosure, a possible implementation mode that the terminal device detects the multiple SSs sent by the network device in the SS period is as follows: the terminal device adopts different beam forming receiving weights to detect the multiple SSs sent by the network device in the SS period. Correspondingly, an implementation mode that the terminal device, according to the detected multiple SSs, detects the signal sent by the network device after the multiple SSs or detects the broadcast channel sent by the network device and corresponding to the multiple SSs is as follows: the terminal device determines a first beam forming receiving weight of the terminal device according to the beam forming receiving weight adopted for a first SS in the detected multiple SSs; and the terminal device adopts the first beam forming receiving weight to detect the signal sent by the network device after the multiple SSs or detect the broadcast channel sent by the network device and corresponding to the multiple SSs.

More specifically, the terminal device may adopt different beam forming weights (called beam forming receiving weights in the disclosure) to detect the SSs repeatedly sent in the SS period and determine the beam forming receiving weight adopted for an SS with maximum receiving quality as a beam forming receiving weight adopted to detect the corresponding broadcast channel. The receiving quality may be measured through a physical parameter such as Reference Signal Receiving Power (RSRP), received signal strength or a correlation peak.

The terminal device adopts different beam forming receiving weights to detect the same SSs and may determine an optimal beam forming receiving weight in these weights. The terminal device adopts the optimal beam forming receiving weight to receive the broadcast channel or other signal which is subsequently sent and then may obtain a higher receiving forming gain, thereby improving detection performance of the broadcast channel or other signal which is subsequently sent.

Furthermore, the terminal device may further acquire a beam forming transmitting weight configured to send signals according to the determined beam forming receiving weight configured to detect the signal or the broadcast channel.

If the numbers of radio frequency units, configured to send signals, of the terminal device and radio frequency units, configured to detect the signal or the broadcast channel, of the terminal device are equal, the beam forming receiving weight determined by the terminal device to detect the signal or the broadcast channel may directly be determined as the beam forming receiving weight configured for the terminal device to send the signals.

If the numbers of the radio frequency units, configured to send the signals, of the terminal device and the radio frequency units, configured to detect the signal or the broadcast channel, of the terminal device are unequal, the beam forming transmitting weight configured for the terminal device to send the signals may be obtained according to an angle corresponding to the beam forming receiving weight determined by the terminal device to detect the signal or the broadcast channel and the number of the radio frequency units, configured to send the signals, of the terminal device.

In the embodiment of the disclosure, the network device may periodically send the multiple SSs in the SS period. Then, the terminal device may periodically detect these SSs to periodically determine the beam forming receiving weight configured to detect the subsequent signal or the broadcast channel and/or the beam forming transmitting weight configured to send the signals, thereby updating these beam forming weights.

In the embodiment of the disclosure, the broadcast channel may be a PBCH configured to transmit a MIB. The MIB may include system information such as a transmission system bandwidth.

In the embodiment of the disclosure, a transmission parameter for the broadcast channel may include at least one of the following parameters: the frequency-domain resource, which is, for example, the PRB, the subcarrier, the sub-band or a set of multiple of the abovementioned resources and may also be the frequency hopping pattern configured to determine the frequency-domain resource; the time-domain resource, which is, for example, the subframe, the symbol or the other defined transmission time unit and may also be a set of the abovementioned resources or the frequency hopping pattern configured to determine the time-domain resource; the subcarrier spacing; or the data transmission time length, for example, the duration.

In the embodiment of the disclosure, the transmission parameter for the broadcast channel may be predetermined by the network device and the terminal device or determined by the terminal device on the basis of information contained in the SSs corresponding to the broadcast channel. For example, the transmission parameter for the broadcast channel is determined according to the network ID contained in the SSs.

In the embodiment of the disclosure, if the transmission parameter for the broadcast channel is predetermined by the network device and the terminal device, the terminal device detects the broadcast channel according to the predetermined transmission parameter. If the transmission parameter for the multiple SSs is contained in the SSs, the terminal device, after detecting the SSs containing the transmission parameter, detects the broadcast channel on the basis of the transmission parameter contained in the SSs. For example, the terminal device may determine the transmission parameter for the broadcast channel according to the network side ID contained in the SSs.

In the embodiment of the disclosure, the network device may send multiple broadcast channels in a broadcast channel transmission period. The broadcast channel transmission period may usually be predetermined.

When the network device sends the multiple broadcast channels in the broadcast channel period, the multiple broadcast channels may contain the same bit information.

Different transmission parameters may be adopted for the broadcast channel sent for many times by the network device. Correspondingly, the terminal device detects the multiple broadcast channels according to different transmission parameters.

In the embodiment of the disclosure, the network device may adopt different beam forming weights to send the multiple broadcast channels. The beam forming weights may be analogue beam forming weights, or digital beam forming weights or hybrid beam forming weights. For example, different beam forming weights may refer to a set of Discrete Fourier Transform (DFT) vectors or may refer to a set of matrix corresponding vectors.

In such case, the terminal device may report broadcast channel indication information to the network device on the basis of a measurement result of the multiple broadcast channels sent by the network device. The broadcast channel indication information is configured to indicate a broadcast channel in the multiple broadcast channels. Under a normal condition, the broadcast channel indication information is configured to indicate a broadcast channel with maximum receiving quality in the broadcast channel detected by the terminal device. For example, when the terminal device adopts the first beam forming receiving weight to detect the multiple broadcast channels, the broadcast channel with maximum receiving quality may be reported to the network device to enable the network device to determine the beam forming weight (for subsequent convenient description, the beam forming weight is called a first beam forming transmitting weight) required to be adopted to subsequently send the signal or the broadcast channel according to the beam forming weight adopted to send the broadcast channel.

In the embodiment of the disclosure, the broadcast channel indication information may be an index of the broadcast channel in the broadcast channel transmission period. For example, if there are four broadcast channels in the broadcast channel transmission period, 2-bit information may be adopted to report the broadcast channel indication information.

The terminal device may report the broadcast channel indication information to a network side through an uplink control channel or an uplink random access channel.

The network device, after receiving the broadcast channel indication information sent by the terminal device, may determine the beam forming weight adopted to subsequently send the signal or the broadcast channel according to the broadcast channel indication information.

A possible implementation mode that the network device determines the beam forming weight adopted to subsequently send the signal according to the broadcast channel indication information is as follows: the network device determines the beam forming weight adopted to send the broadcast channel indicated by the broadcast channel indication information as the beam forming transmitting weight adopted to subsequently send the signal.

The network device adopts different beam forming transmitting weights to send the same broadcast channel and then the terminal device feeds back an optimal broadcast channel, thereby determining an optimal beam forming transmitting weight in these sending weights. The network device adopts the optimal beam forming transmitting weight to send the subsequent broadcast channel or the other signal and then may obtain a higher forming gain, thereby improving detection performance of the broadcast channel or other signal which is subsequently sent.

Furthermore, the network device may also determine a beam forming receiving weight adopted to subsequently receive signals on the basis of the beam forming weight determined to subsequently send the signal.

A possible implementation mode is as follows: if numbers of radio frequency units, configured to send the signal and, and radio frequency units, configured to receive the signals, of the network device are equal, the beam forming weight determined to subsequently send the signal is directly determined as the beam forming receiving weight adopted to subsequently receive the signals.

A possible implementation mode is as follows: if the numbers of the radio frequency units, configured to send the signal and, and radio frequency units, configured to receive the signals, of the network device are unequal, the beam forming receiving weight adopted to subsequently receive the signals is obtained on the basis of an angle (or phase) corresponding to the beam forming weight determined to subsequently send the signal and the number of the radio frequency units configured to receive the signals. For example, if the beam forming weight determined to subsequently send the signal is a DFT vector, dimension (length) extension is performed on the DFT vector to obtain the beam forming receiving weight adopted to subsequently receive the signals.

In the embodiment of the disclosure, the network device may send the multiple broadcast channels in each periodic broadcast channel transmission period. The broadcast channel transmission period may be predetermined.

The network device periodically sends the multiple broadcast channels and then the terminal device may periodically send the broadcast channel indication information to the network device, so that the network device may periodically update its beam forming weights configured to send the signal and/or receive the signals according to the broadcast channel indication information.

A method for signal transmission between a network device and a terminal device will be exemplarily described below in combination with the signal transmission diagrams illustrated in FIG. 4 to FIG. 7.

Figure 4:
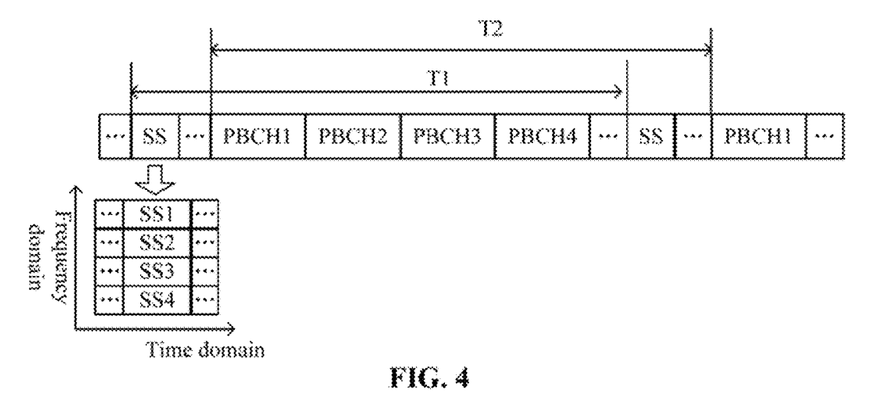
FIG. 4 illustrates a schematic diagram of a method of signal transmission according to an embodiment of the disclosure.

As illustrated in FIG. 4, an SS period is T and a broadcast channel transmission period is T2. There is made such a hypothesis herein that T1=T2. The network device (for example, a base station) sends four SSs an SS1, SS2, SS3 and SS4, in a Frequency Division Multiplexing (FDM) manner in an SS time unit in a synchronization period. That is, the same time-domain resource and different frequency-domain resources are occupied by the four SSs.

The same analogue beam forming vector and sequence may be adopted for the four SSs. Each SS includes a PSS and an SSS.

After a period time (for example, a predetermined time interval), the network device sends PBCHs corresponding to the SSs SS1, SS2, SS3 and SS4. The network device sends the broadcast channel for four times, i.e., a PBCH1, a PBCH2, a PBCH3 and a PBCH4 respectively, in a Time-Division Multiplexing (TDM) manner in four time units respectively. The broadcast channel sent for four times may contain the same information. The same time-frequency resource may be occupied in the time units where they are located. However, different analogue beam forming weights are adopted.

At a receiver, the terminal device detects the SSs at first, adopts different beam forming receiving weights to receive the four SSs on different frequency-domain resources and measures receiving quality of the four SSs respectively. For example, if the terminal device is provided with 16 receiving antennae, four DFT vectors with lengths of 16 may be adopted to receive the SSs. The terminal device determines the beam forming receiving weight corresponding to the SS with maximum receiving quality as a beam forming receiving weight for subsequently receiving the corresponding broadcast channel and other downlink signals.

Then, the terminal device detects the four broadcast channels corresponding to the SSs, measures receiving power to determine the broadcast channel with maximum receiving quality and reports corresponding broadcast channel indexes (2 bits, corresponding to the four broadcast channels respectively) to the network device through a Physical Random Access Channel (PRACH).

The terminal device may adopt the same method to detect the SSs and update the beam forming receiving weights in each SS period.

Figure 5:
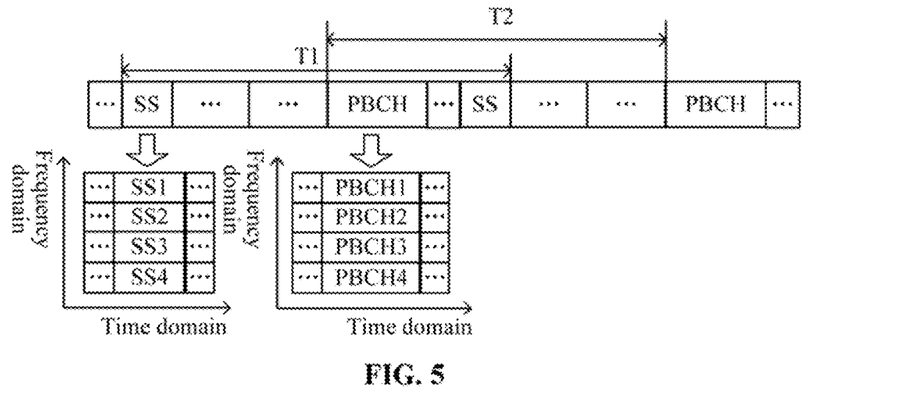
FIG. 5 illustrates a schematic diagram of a method of signal transmission according to an embodiment of the disclosure.

A difference between a method for signal transmission between the network device and the terminal device in FIG. 5 and the method for signal transmission between the network device and the terminal device in FIG. 4 is that: the broadcast channels corresponding to the SSs occupy different frequency-domain resources rather than different time-domain resources. In such case, the terminal device is required to detect the corresponding broadcast channels on different bands.

Figure 6:
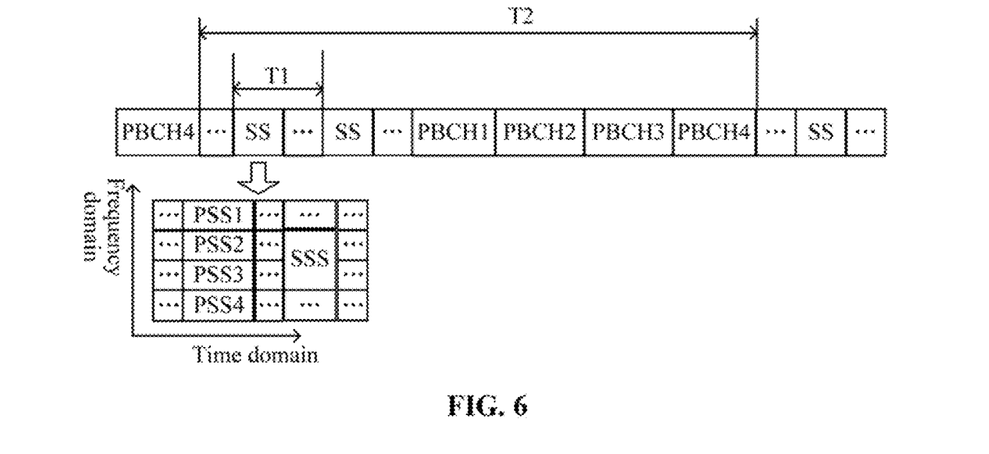
FIG. 6 illustrates a schematic diagram of a method of signal transmission according to an embodiment of the disclosure.

FIG. 6 is another schematic diagram of a method for signal transmission between the network device and the terminal device. The SS period is T1, the corresponding broadcast channel period is T2, and T2≥2T1.

The network device sends a PSS in an SS time unit (for example, a subframe) in a synchronization period. The network device sends four PSSs, i.e., a PSS1, a PSS2, a PSS3 and a PSS4 respectively, in the FDM manner. That is, the same time-domain resource and different frequency-domain resources are occupied by the PSS1, the PSS2, the PSS3 and the PSS4. The same hybrid beam forming vector and sequence may be adopted for the PSS1, the PSS2, the PSS3 and the PSS4.

Then, the network device sends an SSS on a physical resource after a period of time. The SSS is sent only once.

Next, after a period of time, the network device sends broadcast channels corresponding to the PSS1, the PSS2, the PSS3 and the PSS4. The network device sends the broadcast channels for four times, i.e., a PBCH1, a PBCH2, a PBCH3 and a PBCH4 respectively, in four time units respectively. The PBCH1, the PBCH2, the PBCH3 and the PBCH4 contain the same information. The same time-frequency resources are occupied in the time units where they are located. However, different analogue beam forming weights are adopted.

At the receiver, the terminal device detects the SSs at first. The terminal device adopts different beam forming receiving weights to receive the four PSSs on different frequency-domain resources, measures receiving quality of the four PSSs respectively and determines the beam forming receiving weight corresponding to the PSS with maximum receiving quality as a beam forming receiving weight for subsequently receiving the SSS, the broadcast channels corresponding to the SSs and other downlink signals.

The terminal device, after detecting the SSS, detects the four broadcast channels corresponding to the SSs respectively. Since T2≥2T1, the terminal device is required to receive SSs of at least two synchronization periods and then detect the corresponding broadcast channels.

Figure 7:
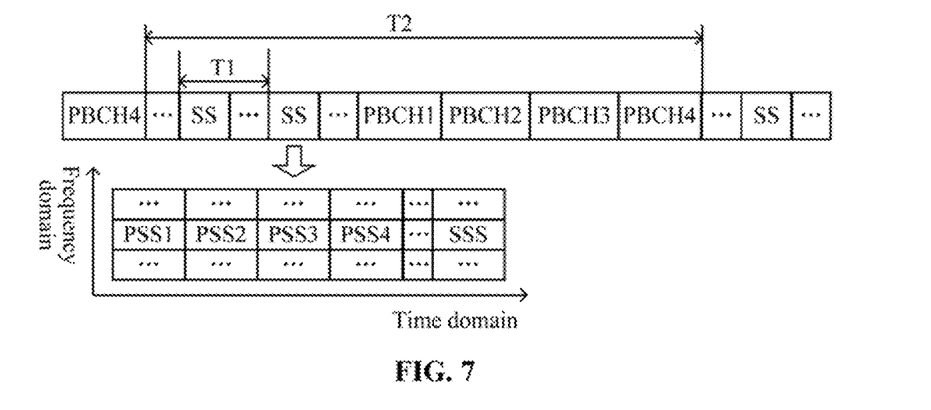
FIG. 7 illustrates a schematic diagram of a method of signal transmission according to an embodiment of the disclosure.

A difference between a method for signal transmission between the network device and the terminal device in FIG. 7 and the method for signal transmission between the network device and the terminal device in FIG. 6 is that: the PSSs occupy different time-domain resources (time units) rather than different frequency-domain resources. Therefore, the terminal device is required to detect the corresponding PSSs on different time units.

Structures of a network device and terminal device of the embodiments of the disclosure will be schematically introduced below in combination with FIG. 8 to FIG. 13.

Figure 8:
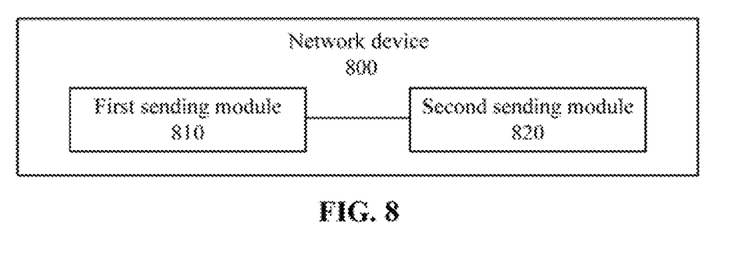
FIG. 8 illustrates a schematic structure diagram of a network device according to another embodiment of the disclosure.

FIG. 8 illustrates a schematic structure diagram of a network device 800 according to an embodiment of the disclosure. The network device 800 of FIG. 8 may implement each step executed by the network device in FIG. 2 to FIG. 7 and will not be elaborated herein for avoiding repetitions. The network device 800 includes a first sending module 810 and a second sending module 820.

The first sending module 810 is configured to send multiple SSs in an SS period.

The second sending module 820 is configured to, after the multiple SSs are sent, send a broadcast channel corresponding to the multiple SSs or send a signal other than the corresponding broadcast channel.

In the embodiment of the disclosure, the network device sends the multiple SSs in the SS period, and then a terminal device may detect the signal or broadcast channel subsequently sent by the network device according to the multiple SSs in the SS period, so that time for which the terminal device detects the signal or the broadcast channel may be shortened, and signal detection performance of the terminal device may further be improved.

According to an embodiment, the same sequence is adopted for the multiple SSs.

According to an embodiment, the first sending module is specifically configured to adopt the same beam forming transmitting weight to send the multiple SSs in the SS period.

According to an embodiment, at least one of the following transmission parameters for the multiple SSs are different: a frequency-domain resource, a time-domain resource, a subcarrier spacing or a data transmission time length.

According to an embodiment, a transmission parameter for the multiple SSs is a transmission parameter predetermined by the network device and a terminal device. Or the transmission parameter for the multiple SSs is a transmission parameter determined by the network device according to information contained in part of SSs in the multiple SSs.

According to an embodiment, at least one of the following transmission parameters for the corresponding broadcast channel is determined by the network device according to information contained in the multiple SSs: the frequency-domain resource, the time-domain resource, an information scrambling manner, the subcarrier spacing or the data transmission time length. The second sending module is specifically configured to, after the multiple SSs are sent, send the corresponding broadcast channel according to the determined transmission parameter.

According to an embodiment, the second sending module 820 is specifically configured to, after the multiple SSs are sent, send multiple broadcast channels corresponding to the multiple SSs. The multiple SSs contain the same information.

According to an embodiment, the second sending module is specifically configured to, after the multiple SSs are sent, adopt different beam forming transmitting weights to send the multiple broadcast channels corresponding to the multiple SSs.

According to an embodiment, the corresponding broadcast channel includes the multiple broadcast channels. The multiple broadcast channels may differ from each other in at least one of the following transmission parameters: a HARQ redundancy version, the frequency-domain resource, the time-domain resource, the information scrambling manner, the subcarrier spacing or the data transmission time length.

According to an embodiment, when the corresponding broadcast channel includes the multiple broadcast channels, the network device further includes a receiving module, configured to receive broadcast channel indication information sent by the terminal device, the broadcast channel indication information being configured to indicate a first broadcast channel in the multiple broadcast channels.

According to an embodiment, the network device further includes a first determination module, configured to determine a first beam forming transmitting weight adopted by the network device to subsequently send the broadcast channel according to the beam forming transmitting weight adopted to send the first broadcast channel.

According to an embodiment, the first determination module is specifically configured to determine the first beam forming transmitting weight according to the beam forming transmitting weight adopted to send the first broadcast channel.

According to an embodiment, the network device further includes a second determination module, configured to determine a first beam forming transmitting weight adopted by the network device to subsequently receive signals sent by the terminal device according to the beam forming transmitting weight adopted to send the first broadcast channel.

According to an embodiment, the receiving module is specifically configured to receive the broadcast channel indication information sent by the terminal device through a control channel or a random access channel.

According to an embodiment, the multiple broadcast channels contain the same MIB information.

According to an embodiment, physical resources adopted for the SSs sent for many times forms a predefined mapping relationship with physical resources adopted for the corresponding broadcast channel.

According to an embodiment, the corresponding broadcast channel is a PBCH configured to transmit a MIB.

Figure 9:
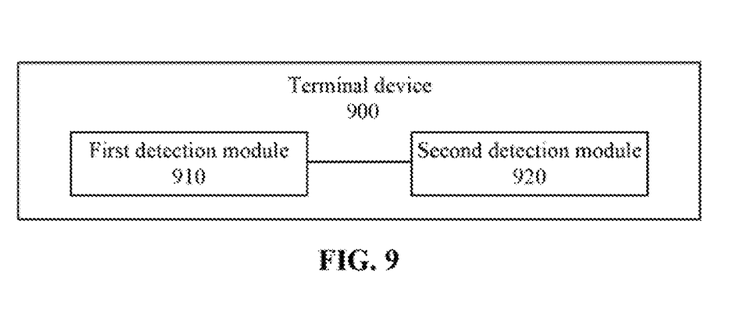
FIG. 9 illustrates a schematic structure diagram of a terminal device according to another embodiment of the disclosure.

FIG. 9 illustrates a schematic structure diagram of a terminal device 900 according to an embodiment of the disclosure. The terminal device 900 of FIG. 9 may implement each step executed by the terminal device in FIG. 2 to FIG. 7 and will not be elaborated herein for avoiding repetitions. The terminal device 90 includes a first detection module 910 and a second detection module 920.

The first detection module 910 is configured to detect multiple SSs sent by a network device in an SS period.

The second detection module 920 is configured to, according to the detected multiple SSs, detect a broadcast channel sent by the network device and corresponding to the multiple SSs or detect a signal, other than the corresponding broadcast channel, sent by the network device.

In the embodiments of the disclosure, the terminal device detects the multiple SSs sent by the network device in the SS period, and then the terminal device may detect the signal or broadcast channel subsequently sent by the network device according to the multiple SSs in the SS period, so that time for which the terminal device detects the subsequent signal or the broadcast channel may be shortened, and signal detection performance of the terminal device may further be improved.

According to an embodiment, the same sequence is adopted for the multiple SSs.

According to an embodiment, at least one of the following transmission parameters for the multiple SSs are different: a frequency-domain resource, a time-domain resource, a subcarrier spacing or a data transmission time length.

According to an embodiment, the first detection module is specifically configured to detect the multiple SSs according to a transmission parameter predetermined by the network device and the terminal device or according to a transmission parameter determined on the basis of information contained in part of SSs in the multiple SSs.

According to an embodiment, the second detection module is specifically configured to determine at least one of the following transmission parameters for the corresponding broadcast channel according to information contained in the detected multiple SSs: the frequency-domain resource, the time-domain resource, an information scrambling manner, the subcarrier spacing or the data transmission time length, and detect the corresponding broadcast channel according to the determined transmission parameter.

According to an embodiment, the first detection module is specifically configured to adopt different beam forming receiving weights to detect the multiple SSs. The second detection module is specifically configured to determine a first beam forming receiving weight of the terminal device according to the beam forming receiving weight adopted for a first SS in the detected multiple SSs and adopt the first beam forming receiving weight to detect the other signal or detect the corresponding broadcast channel.

According to an embodiment, the first SS is an SS with maximum receiving quality in the multiple SSs detected by the terminal device.

According to an embodiment, the terminal device further includes a determination module, configured to determine, according to the first beam forming receiving weight, a first beam forming transmitting weight configured for the terminal device to send signals to the network device.

According to an embodiment, the corresponding broadcast channel includes multiple broadcast channels containing the same information.

According to an embodiment, the multiple broadcast channels differ from each other in at least one of the following transmission parameters: a HARQ redundancy version, the frequency-domain resource, the time-domain resource, the information scrambling manner, the subcarrier spacing or the data transmission time length.

According to an embodiment, when the corresponding broadcast channel detected by the terminal device includes the multiple broadcast channels, the terminal device further includes a sending module, configured to send broadcast channel indication information to the network device, the broadcast channel indication information being configured to indicate a first broadcast channel in the multiple broadcast channels.

According to an embodiment, the sending module is specifically configured to send the broadcast channel indication information to the network device through a control channel or a random access channel.

According to an embodiment, the first broadcast channel is a broadcast channel with maximum receiving quality in the multiple broadcast channels detected by the terminal device.

According to an embodiment, physical resources adopted for the multiple SSs forms a predefined mapping relationship with physical resources adopted for the corresponding broadcast channel.

According to an embodiment, the corresponding broadcast channel is a PBCH configured to transmit a MIB.

Figure 10:
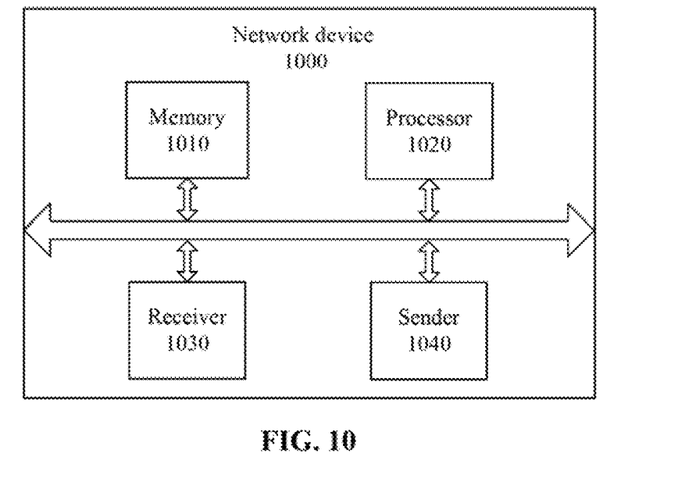
FIG. 10 illustrates a schematic structure diagram of a network device according to another embodiment of the disclosure.

FIG. 10 illustrates a schematic block diagram of a network device 100) according to an embodiment of the disclosure. It is to be understood that the network device 1000 of FIG. 10 may implement each step executed by the network device in FIG. 2 to FIG. 7 and will not be elaborated herein for avoiding repetitions. The network device 1000 includes a memory 1010, a processor 1020, a receiver 1030 and a sender 1040.

The memory 1010 is configured to store a program.

The processor 1020 is configured to execute the program in the memory 1010. When the program is executed, the processor 1020 is specifically configured to call the sender 1040 to send multiple SSs in an SS period.

The processor 1020 is further configured to call the sender 1040 to, after the multiple SSs are sent, send a broadcast channel corresponding to the multiple SSs or send a signal other than the corresponding broadcast channel.

In the embodiment of the disclosure, the network device sends the multiple SSs in the SS period, and then a terminal device may detect the signal or broadcast channel subsequently sent by the network device according to the multiple SSs in the SS period, so that time for which the terminal device detects the signal or the broadcast channel may be shortened, and signal detection performance of the terminal device may further be improved.

According to an embodiment, the same sequence is adopted for the multiple SSs.

According to an embodiment, the sender 1040 is specifically configured to adopt the same beam forming transmitting weight to send the multiple SSs in the SS period.

According to an embodiment, at least one of the following transmission parameters for the multiple SSs are different: a frequency-domain resource, a time-domain resource, a subcarrier spacing or a data transmission time length.

According to an embodiment, a transmission parameter for the multiple SSs is a transmission parameter predetermined by the network device and a terminal device. Or the transmission parameter for the multiple SSs is a transmission parameter determined by the network device according to information contained in part of SSs in the multiple SSs.

According to an embodiment, at least one of the following transmission parameters for the corresponding broadcast channel is determined by the network device according to information contained in the multiple SSs: the frequency-domain resource, the time-domain resource, an information scrambling manner, the subcarrier spacing or the data transmission time length. The sender 1040 is specifically configured to, after the multiple SSs are sent, send the corresponding broadcast channel according to the determined transmission parameter.

According to an embodiment, the sender 1040 is specifically configured to, after the multiple SSs are sent, send multiple broadcast channels corresponding to the multiple SSs. The multiple SSs contain the same information.

According to an embodiment, the sender 1040 is specifically configured to, after the multiple SSs are sent, adopt different beam forming transmitting weights to send the multiple broadcast channels corresponding to the multiple SSs.

According to an embodiment, the corresponding broadcast channel includes the multiple broadcast channels. The multiple broadcast channels may differ from each other in at least one of the following transmission parameters: a HARQ redundancy version, the frequency-domain resource, the time-domain resource, the information scrambling manner, the subcarrier spacing or the data transmission time length.

According to an embodiment, when the corresponding broadcast channel includes the multiple broadcast channels, the processor 1020 is further configured to call the receiver 1030 to receive broadcast channel indication information sent by the terminal device, the broadcast channel indication information being configured to indicate a first broadcast channel in the multiple broadcast channels.

According to an embodiment, the processor 1020 is further configured to determine a first beam forming transmitting weight adopted by the network device to subsequently send the broadcast channel according to the beam forming transmitting weight adopted to send the first broadcast channel.

According to an embodiment, the processor 1020 is specifically configured to determine the first beam forming transmitting weight according to the beam forming transmitting weight adopted to send the first broadcast channel.

According to an embodiment, the receiver 1030 is specifically configured to receive the broadcast channel indication information sent by the terminal device through a control channel or a random access channel.

According to an embodiment, the processor 1020 is further configured to determine a first beam forming transmitting weight adopted by the network device to subsequently receive signals sent by the terminal device according to the beam forming transmitting weight adopted to send the first broadcast channel.

According to an embodiment, physical resources adopted for the SSs sent for many times forms a predefined mapping relationship with physical resources adopted for the corresponding broadcast channel.

According to an embodiment, the corresponding broadcast channel is a PBCH configured to transmit a MIB.

Figure 11:
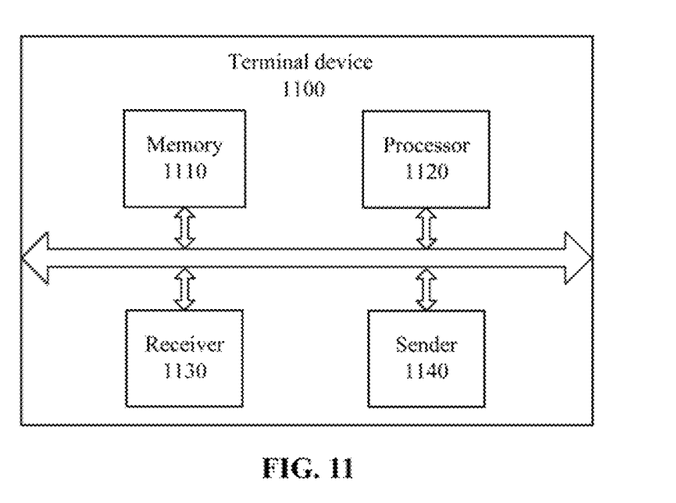
FIG. 11 illustrates a schematic structure diagram of a terminal device according to another embodiment of the disclosure.

FIG. 11 illustrates a schematic block diagram of a terminal device 1100 according to an embodiment of the disclosure. It is to be understood that the terminal device 1100 of FIG. 11 may implement each step executed by the terminal device in FIG. 2 to FIG. 7 and will not be elaborated herein for avoiding repetitions. The terminal device 1100 includes a memory 1110, a processor 1120, a receiver 1130 and a sender 1140.

The memory 1110 is configured to store a program.

The processor 1120 is configured to execute the program in the memory 1110. When the program is executed, the processor 1120 calls the receiver 1130 to detect multiple SSs sent by a network device in an SS period and detect a broadcast channel signal corresponding to the multiple SSs or a signal other than the corresponding broadcast channel, sent after the multiple SSs, according to the detected multiple SSs.

In the embodiment of the disclosure, the network device sends the multiple SSs in the SS period, and then a terminal device may detect the signal or broadcast channel subsequently sent by the network device according to the multiple SSs in the SS period, so that time for which the terminal device detects the signal or the broadcast channel may be shortened, and signal detection performance of the terminal device may further be improved.

According to an embodiment, the same sequence is adopted for the multiple SSs.

According to an embodiment, at least one of the following transmission parameters for the multiple SSs are different: a frequency-domain resource, a time-domain resource, a subcarrier spacing or a data transmission time length.

According to an embodiment, the processor 1120 is specifically configured to call the receiver 1130 to detect the multiple SSs according to a transmission parameter predetermined by the network device and the terminal device or according to a transmission parameter determined on the basis of information contained in part of SSs in the multiple SSs.

According to an embodiment, the processor 1120 is specifically configured to call the receiver 1130 to determine at least one of the following transmission parameters for the corresponding broadcast channel according to information contained in the detected multiple SSs: the frequency-domain resource, the time-domain resource, an information scrambling manner, the subcarrier spacing or the data transmission time length, and detect the corresponding broadcast channel according to the determined transmission parameter.

According to an embodiment, the processor 1120 is specifically configured to call the receiver 1130 to adopt different beam forming receiving weights to detect the multiple SSs, determine a first beam forming receiving weight of the terminal device according to the beam forming receiving weight adopted for a first SS in the detected multiple SSs and adopt the first beam forming receiving weight to receive the other signal or corresponding broadcast channel sent after the multiple SSs.

According to an embodiment, the first SS is an SS with maximum receiving quality in the multiple SSs detected by the terminal device.

According to an embodiment, the processor 1120 is further configured to determine, according to the first beam forming receiving weight, a first beam forming transmitting weight configured for the terminal device to send signals to the network device.

According to an embodiment, the corresponding broadcast channel includes multiple broadcast channels containing the same information.

According to an embodiment, the corresponding broadcast channel detected by the terminal device includes the multiple broadcast channels. The multiple broadcast channels differ from each other in at least one of the following transmission parameters: a HARQ redundancy version, the frequency-domain resource, the time-domain resource, the information scrambling manner, the subcarrier spacing or the data transmission time length.

According to an embodiment, when the corresponding broadcast channel detected by the terminal device includes the multiple broadcast channels, the processor 1120 is further configured to call the sender 1140 to send broadcast channel indication information to the network device, the broadcast channel indication information being configured to indicate a first broadcast channel in the multiple broadcast channels.

According to an embodiment, the processor 1120 is specifically configured to call the sender 1140 to send the broadcast channel indication information to the network device through a control channel or a random access channel.

According to an embodiment, the first broadcast channel is a broadcast channel with maximum receiving quality in the multiple broadcast channels detected by the terminal device.

According to an embodiment, physical resources adopted for the multiple SSs forms a predefined mapping relationship with physical resources adopted for the corresponding broadcast channel.

According to an embodiment, the corresponding broadcast channel is a PBCH configured to transmit a MIB.

Figure 12:
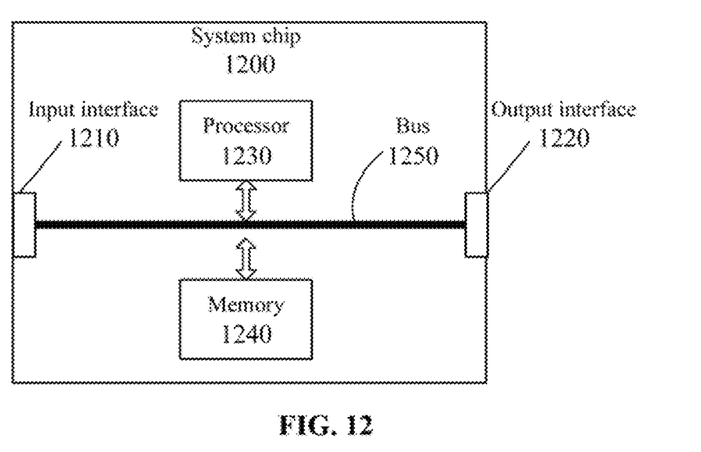
FIG. 12 illustrates a schematic structure diagram of a system chip according to another embodiment of the disclosure.

FIG. 12 illustrates a schematic structure diagram of a system chip according to an embodiment of the disclosure. The system chip 1200 of FIG. 12 includes an input interface 1210, an output interface 1220, at least one processor 1230 and a memory 1240. The input interface 1210, the output interface 1220, the processor 1230 and the memory 1240 are connected through a bus. The processor 1230 is configured to execute a code in the memory 1240. When the code is executed, the processor 1230 implements the method executed by the network device in FIG. 2 to FIG. 7.

Figure 13:
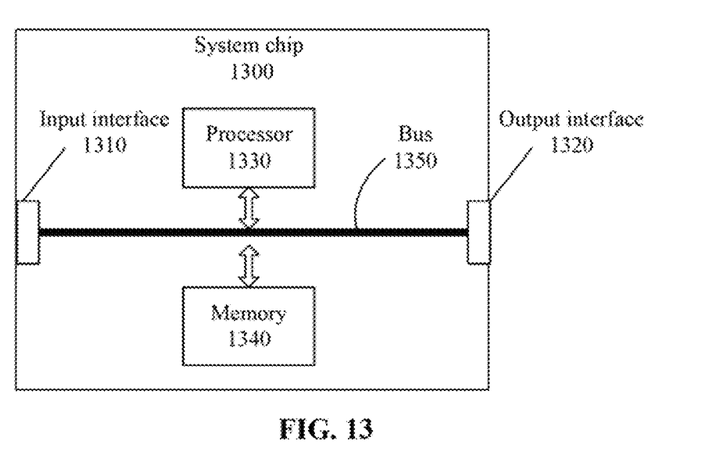
FIG. 13 illustrates a schematic structure diagram of a system chip according to another embodiment of the disclosure.

FIG. 13 illustrates a schematic structure diagram of a system chip according to an embodiment of the disclosure. The system chip 1300 of FIG. 13 includes an input interface 1310, an output interface 1320, at least one processor 1330 and a memory 1340. The input interface 1310, the output interface 1320, the processor 1330 and the memory 1340 are connected through a bus. The processor 1330 is configured to execute a code in the memory 1340. When the code is executed, the processor 1330 implements the method executed by the terminal device in FIG. 2 to FIG. 7.

It is to be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method of signal transmission, comprising:
   receiving, by a terminal device, a plurality of Synchronization Signals (SSs) in a synchronization signal period, wherein a same sequence is adopted for the plurality of SSs;
   determining, by the terminal device, an information scrambling manner for a broadcast channel corresponding to the plurality of SSs according to information contained in the received plurality of SSs; and
   detecting, by the terminal device according to the determined information scrambling manner the broadcast channel corresponding to the plurality of SSs.

2. The method of claim 1, wherein the plurality of SSs differ from each other in at least one of a frequency-domain resource, a time-domain resource, a sub-carrier spacing or a data transmission time length.

3. The method of claim 1, wherein receiving, by the terminal device, the plurality of SSs in the synchronization signal period comprises:
   receiving, by the terminal device, the plurality of SSs according to a transmission parameter predetermined by a network device and the terminal device or according to a transmission parameter determined on the basis of information contained in part of SSs in the plurality of SSs.

4. The method of claim 1, further comprising:
   determining, by the terminal device, at least one of the following transmission parameters for the corresponding broadcast channel according to information contained in the received plurality of SSs the frequency-domain resource, the time-domain resource, the sub-carrier spacing or the data transmission time length; and
   detecting, by the terminal device, the corresponding broadcast channel according to the determined transmission parameter.

5. The method of claim 1, wherein receiving, by the terminal device, the plurality of SSs in the synchronization signal period comprises:
   adopting, by the terminal device, different beam forming receiving weights to detect the plurality of SSs; and
   detecting, by the terminal device according to the determined information scrambling manner, the broadcast channel corresponding to the plurality of SSs comprises:
   determining, by the terminal device, a first beam forming receiving weight of the terminal device according to the beam forming receiving weights adopted for a first SS in the detected plurality of SSs, and
   detecting, by the terminal device according to the determined information scrambling manner and the first beam forming receiving weight, the corresponding broadcast channel.

6. The method of claim 5, further comprising:
   determining, by the terminal device according to the first beam forming receiving weight, a first beam forming transmitting weight configured for the terminal device to send signals to a network device.

7. The method of claim 1, further comprising:
   sending, by the terminal device, broadcast channel indication information; wherein the broadcast channel indication information being configured to indicate a first broadcast channel in the plurality of broadcast channels.

8. The method of claim 7, wherein the first broadcast channel is determined according to a Reference Signal Receiving Power (RSRP).

9. The method of claim 1, wherein the corresponding broadcast channel includes a plurality of broadcast channels containing the same information.

10. The method of claim 9, wherein the plurality of broadcast channels differ from each other in at least one of the following transmission parameters: a Hybrid Automatic Repeat reQueset (HARQ) redundancy version, the frequency-domain resource, the time-domain resource, the information scrambling manner, the sub-carrier spacing or the data transmission time length.

11. The method of claim 9, further comprising:
    sending, by the terminal device, broadcast channel indication information to a network device, the broadcast channel indication information being configured to indicate a first broadcast channel in the plurality of broadcast channels.

12. The method of claim 11, wherein sending, by the terminal device, the broadcast channel indication information to the network device comprises:
    sending, by the terminal device, the broadcast channel indication information to the network device through a control channel or a random access channel.

13. The method of claim 11, wherein the first broadcast channel is a broadcast channel with maximum receiving quality in the plurality of broadcast channels detected by the terminal device.

14. The method of claim 1, wherein physical resources adopted for the plurality of SSs forms a predefined mapping relationship with physical resources adopted for the corresponding broadcast channel.

15. The method of claim 1, wherein the corresponding broadcast channel is a Physical Broadcast Channel (PBCH) configured to transmit Master Information Block (MIB) MIB.

16. A terminal device, comprising:
    at least one processor; and
    at least one memory including, program codes; the at least one memory and the program codes configured to, with the at least one processor, cause the terminal device to perform actions comprising:

receiving a plurality of Synchronization Signals (SSs) in a synchronization signal period, wherein a same sequence is adopted for the plurality of SSs;

determining an information scrambling manner for a broadcast channel corresponding to the plurality of SSs according to information contained in the received plurality of SSs; and detecting according to the determined information scrambling manner, the broadcast channel corresponding to the plurality of SSs.

17. The terminal device of claim 16, wherein the corresponding broadcast channel includes a plurality of broadcast channels containing the same information.

18. The terminal device of claim 16, wherein the actions further comprise:

sending broadcast channel indication information to a network device, the broadcast channel indication information being configured to indicate a first broadcast channel in the plurality of broadcast channels.

19. A non-transitory computer-readable storage medium storing instructions, the instructions, when executed by a terminal device, causing the terminal device to perform a method of signal transmission, the method comprising:

receiving a plurality of Synchronization Signals (SSs) in a synchronization signal period, wherein a same sequence is adopted for the plurality of SSs;

determining an information scrambling manner for a broadcast channel corresponding to the plurality of SSs according to information contained in the received plurality of SSs; and detecting according to the determined information scrambling manner, the broadcast channel corresponding to the plurality of SSs.

* * * * *